Aug. 9, 1927.
N. R. HAAS
1,638,305
BATTERY CHARGING APPARATUS
Filed Nov. 29, 1924
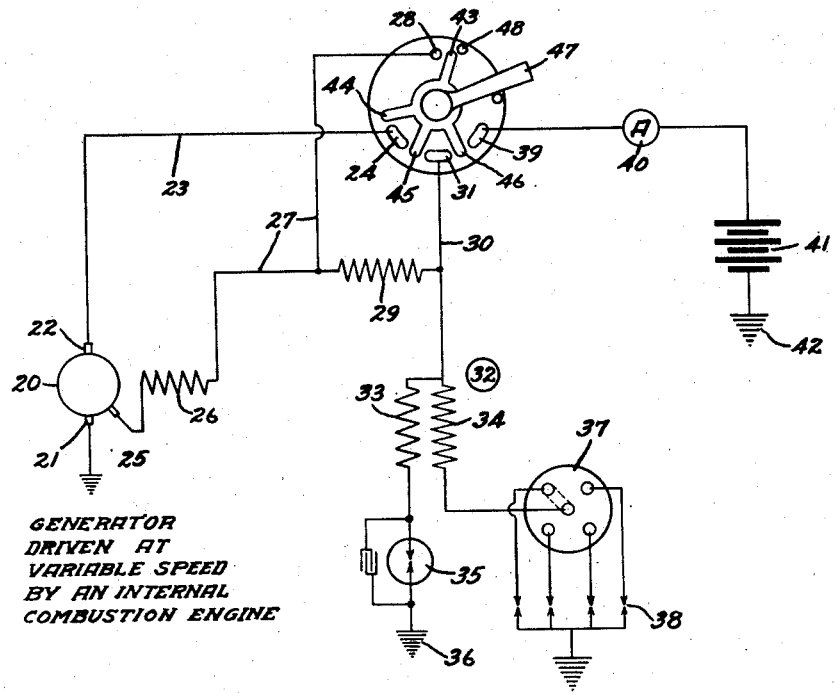
Inventor
Nelson R. Haas
By Spencer, Duvall and Hardman
Attorneys Patented Aug. 9, 1927.

1,638,305

UNITED STATES PATENT OFFICE.

NELSON ROBERT HAAS, OF DAYTON, OHIO, ASSIGNOR, BY MESNE ASSIGNMENTS, TO DELCO-REMY CORPORATION, OF DAYTON, OHIO, A CORPORATION OF DELAWARE.

BATTERY-CHARGING APPARATUS.

Application filed November 29, 1924. Serial No. 752,868.

This invention relates to electric battery charging apparatus and more particularly to the type of apparatus used on an automobile. In any automobile battery charging system which includes a generator driven at variable speed by the internal combustion engine which propels the vehicle, the generator is usually provided with a regulating device which is adjusted so that the battery will be charged properly under normal conditions. One well known type of generator regulator is the third or auxiliary brush type, which is provided by connecting one end of the shunt field of the generator with auxiliary brush located between the main brushes of the generator. By adjusting this auxiliary or third brush, the speed-output characteristics of the generator may be varied. This adjustment is generally made by the manufacturer of the equipment or by an expert at an electrical service garage. Frequently, a single adjustment of the charge rate of the battery is not correct for all seasons or temperature conditions. It may be too low for winter, or too high for summer. Usually the automobile is driven to a service garage to have the regulation adjusted so that the charge rate may be varied. Sometimes a variation of charge rate is necessary but for a relatively brief period, and frequent trips to an electrical service garage for this purpose are inconvenient.

It is therefore an object of the invention to provide means within convenient reach of the driver's seat which may be readily manipulated for varying the charge rate of the battery. In carrying out this object of the invention, it is a further object to provide an electric switch having an operating handle which may be used for controlling the ignition apparatus or other electrical translation device and also for controlling the regulation of the generator.

Further objects and advantages of the present invention will be apparent from the following description, reference being had to the accompanying drawing wherein a preferred form of embodiment of the present invention is clearly shown.

The figure of the drawings is a wiring diagram illustrating one form of the present invention.

Referring to drawing, 20 designates a generator which is driven at variable speed by an internal combustion engine which propels the vehicle for which the present invention is particularly adapted. Generator 20 includes main brushes 21 and 22, the former being grounded the latter being connected with a wire 23 which leads to a switch stationary contact 24. An auxiliary or third brush 25 is connected with the shunt field 26 which is connected by wire 27 with a switch stationary contact 28. A resistance element 29 is connected with wire 27 and with wire 30 connected with stationary contact 31 and with an ignition coil 32 having a primary 33 and a secondary 34. The primary 33 is connected with a timer 35, grounded at 36; and the secondary 34 is connected with a distributor 37 which distributes sparking impulses in a well known manner to the various spark plugs 38 of the engine.

A stationary contact 39 is connected through ammeter 40 with a battery 41 which is grounded at 42. The contacts 28, 24, 31 and 39 are arranged to be engaged respectively, by the contact arms, 43, 44, 45 and 46 of a movable switch spider which is actuated by a handle 47.

The manner of using the present invention is as follows:

When an ignition apparatus is disconnected from the battery, the switch device will be in the position indicated by the drawing. To connect the generator and ignition apparatus with the battery, the handle 47 is moved in a counterclockwise direction, so that the contacts 28, 24, 31 and 39 will be connected, respectively with the spider arms 43, 44, 45 and 46. In this position of the switch the resistance element 29 will be short-circuited and consequently the generator output will be higher than it would be where resistance is provided to cut down the field excitation. In this position of the switch the generator will charge the battery at the maximum rate which has been determined by the initial setting of the third brush. Therefore, this is a desirable position of the switch for driving under conditions where the engine starter is used frequently or the engine is difficult to start, as in winter, or the intervals of battery charging are brief and infrequent.

If the lever 47 be moved still further in a counter-clockwise direction until it engages a stop 48, the contact 43 will be moved out of engagement with the contact 28, but the contacts 44, 45 and 46 are still in engagement with contacts 24, 31 and 39, respectively, when the switch is in this position. The generator and ignition apparatus are still connected with the battery but the short-circuit of the resistance element is interrupted so that the resistance element is rendered operative to reduce the field excitation. This latter position of the switch is desirable particularly in warm weather and under driving conditions wherein the battery charging intervals are relatively long and the use of the engine starting motor relatively infrequent, or the engine starts easily, or there is less burning of the lamps.

Practice of burning the automobile headlights in the day time when driving for long periods is frequently resorted to in order to reduce the charge rate of the battery. Obviously this is an unnecessary use of the lamps and materially reduces the life of the lamps for useful illumination. The present invention renders the burning of head lamps unnecessary since the driver may readily manipulate the ignition switch in order to obtain the desired charging rate as indicated by the ammeter 40.

Conversely, in cold weather, during which the battery charge rate may be higher without injurious effect, it has generally been the practice to adjust the generator third brush in order to increase the charge rate. This practice is rendered unnecessary by the present invention since the driver has but to manipulate the ignition switch in order to obtain the high charge rate as indicated by the ammeter.

While the form of embodiment of the present invention as herein disclosed, constitutes a preferred form, it is to be understood that other forms might be adopted, all coming within the scope of the claims which follow.

What is claimed is as follows:

1. An electrical system comprising, in combination, a generator driven by an internal combustion engine at variable speed, a battery charged thereby, electrical ignition apparatus for the engine, means for reducing the generator field excitation, and a switch having a manually operable member movable into one position for connecting the battery, generator and ignition apparatus, and movable into a second position for rendering said means operative while maintaining the connection of the battery, generator and ignition apparatus.

2. An electrical system comprising, in combination, a generator driven by an internal combustion engine at variable speed, a battery charged thereby, electrical ignition apparatus for the engine, a resistance in series with the generator field winding and a switch having a manually operable member movable into one position for connecting the battery, generator and ignition apparatus and for connecting the field winding with the generator armature with the resistance short-circuited, and movable into a second to interrupt the short circuit of the resistance while maintaining the connection of the battery, generator and ignition apparatus.

3. An electrical system comprising, in combination, a generator driven by an internal combustion engine at variable speed, and having third brush regulation, a battery charged by the generator, a resistance, electrical ignition apparatus for the engine, and a switch movable into one position to render the ignition operative and into another position to rendering the resistance operative to reduce the field excitation while maintaining the ignition apparatus operative.

4. An electrical system comprising, in combination, a generator, a battery charged thereby, an electrical translation device, means for regulating the generator, and a switch having a manually operable member movable into one position for connecting the generator and battery and translation device, and movable into a second position for controlling said means while maintaining the connection of the generator, battery and translation device.

In testimony whereof I hereto affix my signature.

NELSON ROBERT HAAS.